July 10, 1951  C. R. SACCHINI  2,560,000
ELECTRIC WINDSHIELD WIPER WITH DYNAMIC BRAKE PARKING
Filed Jan. 27, 1949  2 Sheets-Sheet 1

Inventor
COLUMBUS R. SACCHINI
By George M. Soule
Attorney

Inventor
COLUMBUS R. SACCHINI
Attorney

Patented July 10, 1951

2,560,000

UNITED STATES PATENT OFFICE 2,560,000

ELECTRIC WINDSHIELD WIPER WITH DYNAMIC BRAKE PARKING

Columbus R. Sacchini, Willoughby, Ohio, assignor to The Marquette Metal Products Company, Cleveland, Ohio, a corporation of Ohio Application January 27, 1949, Serial No. 73,142

2 Claims. (Cl. 318—275)

The invention relates primarily to an improved parking means for electric-motor-operated windshield wipers, and specifically to a parking mechanism or apparatus utilizing what is known in the electrical art as dynamic braking, thus indicating the principal objects.

It is common in the windshield wiping art to drive a wiper blade to and fro by an electric motor through the intermediary of a speed reduction and motor converter mechanism. For parking the wiper blade generally in a desired position out of view of the driver or pilot one expedient is to provide a switch to turn off current to the motor at the proper time; and auxiliary stopping devices have been used therewith to provent coasting of the wiper past the desired parking position through inertia of the rotating and other parts. Such auxiliary devices are usually costly and frequently impose destructive shocks on the mechanism during the parking operation. The present invention utilizes a dynamic breaking circuit for the electric motors; a primary control means enabling the parking operation to be initiated manually, and a cooperating or secondary control means which causes application of the dynamic brake to stop the wiper when and only when the wiper has reached the desired parking position—thus indicating a more specific object of the invention. Other objects will be explained or made apparent below.

Figure 2:
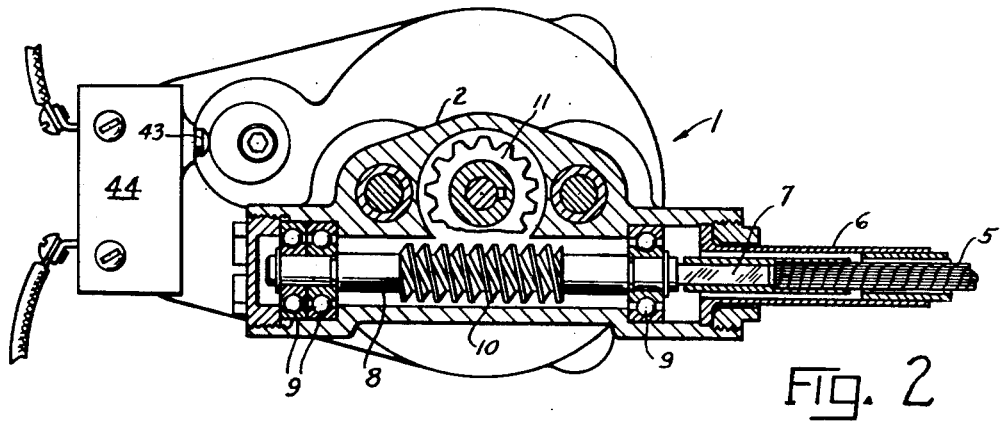
Figure 1:
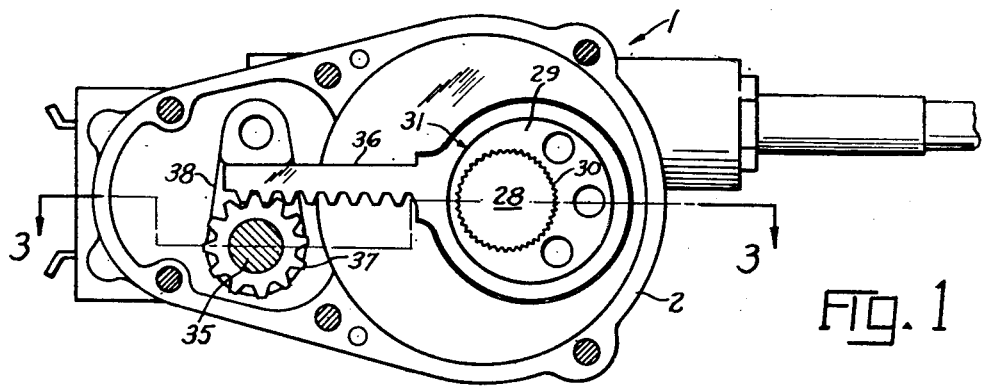
Figure 3:
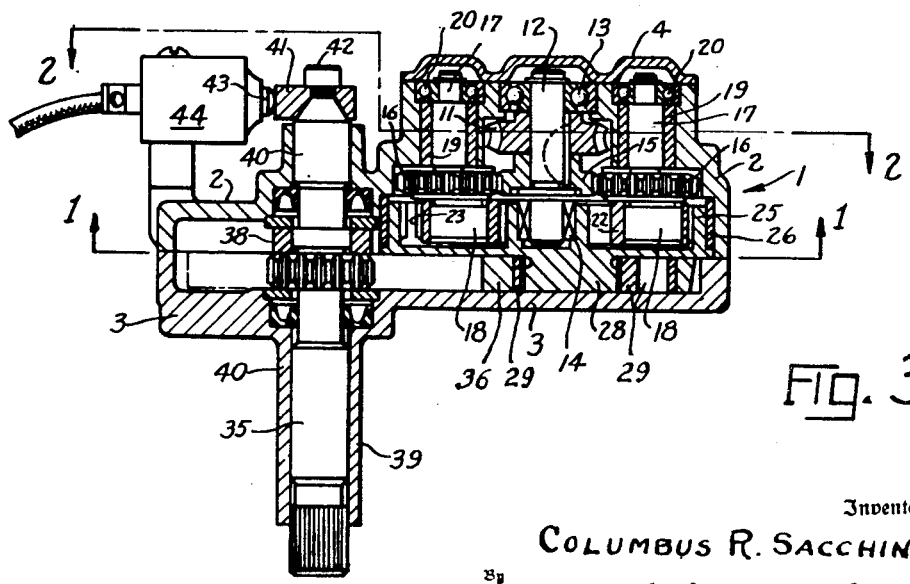
Figure 4:
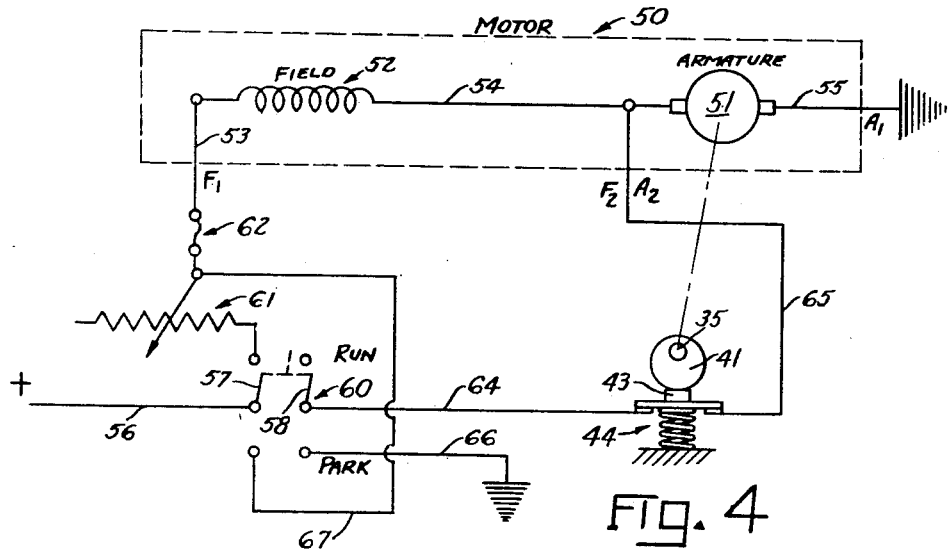
Figure 5:
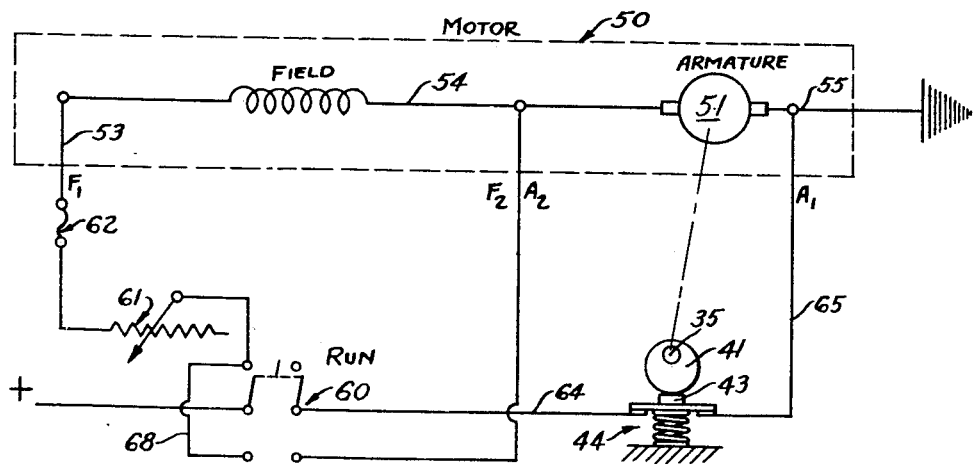

In the drawings, Fig. 1 is a front elevation of a suitable motion converter and reduction gear mechanism unit adapted to be driven by an electric motor, a cover portion of the unit being removed and its fastenings being cut as indicated by the line 1—1 of Fig. 3; Fig. 2 is a rear side view partly in section as indicated at 2—2, Fig. 3; Fig. 3 is a sectional plan view as indicated at 3—3, Fig. 1; and Figs. 4 and 5 are electrical diagrams showing two different motor speed adjusting and parking control circuits—Fig. 4 being preferred.

Figs. 1, 2 and 3 show, at 1 an improved form of the reduction gearing and converter unit of my prior application Serial No. 631,075 filed November 27, 1945, now abandoned, and owned by the assignee hereof. The improved unit is not being claimed in the instant application and is shown herein mainly for illustration of the secondary control portion of the dynamic braking system hereof.

The body of the unit 1 comprises a main body section 2 and front and rear cover sections 3 and 4. Power input to the unit is usually through a flexible drive shaft 5 entering a tubular adapter 6 secured as clearly shown in Fig. 2, the shaft being coupled as at 7 with a worm shaft 8 supported in anti-friction bearings 9. The worm 10 on the shaft 8 is preferably of the plural or multiple thread (e. g. four lead) type for maximum efficiency and meshes with a complementary worm wheel 11, Figs. 2 and 3, on a transverse shaft 12 supported on bearings 13 and 14 within the section 2. Bearing 14 is in a drive wheel 28 described later. The worm drive affords a 5:1 reduction to shaft 12.

The principal speed reduction of the unit 1 is through a gyratory gear system which is essentially that of U. S. Patent 72,792 to Arthur W. Browne, 1867. The worm wheel 11 and a central driving gear 15 of said system have a common key connection with shaft 12, the gear 15 constantly meshing with identical gears 16 rigid with respective crank-operating shafts 17 having parallel cylindrical crank or cam heads 18 projecting from the shafts and eccentrically of their respective axes which are fixed by supporting radial and axial thrust bearings 19 and 20 respectively in the body section 2.

The crank or cam heads 18 fit complementary openings in a gyratory eccentric gear member 22 which is non-rotatably supported by the eccentric heads 18 and has a full complement of external gear teeth 23. Said teeth mesh continually at one peripheral region only with internal teeth of an output member 25 of the gearing in the form of a drive wheel which is maintained on a fixed axis in the casing concentric with the drive shaft 12 by a surroundng bearing sleeve 26. The gyrating gear 22 uniformly advances the wheel 26 at a relatively slow rate as determined by the difference in the number of teeth on part of the gyratory gear and wheel 25 (6 in the illustrated form, affording a reduction of 105:6). A crank pin on the drive wheel is formed by a peripherally serrated circular stub 28 eccentric to the drive wheel axis and a crank pin element 29 surrounding the stub and internally serrated to mate the serrations of the stub as at 30. The crank pin element has an external circular crank-forming surface 31 which is eccentric to the axis of the serrated opening for adjustment of crank throw from zero to the maximum throw position in which illustrated.

The revolving motion of the crank pin element 29 is transmitted to an oscillatory power take-off or output shaft 35 by a pitman rod 36 having teeth held by a freely rocking yoke 38 permanently in mesh with teeth of a gear 37 fast on the shaft 35. One end of the shaft 35 extends through a bearing portion 39 of the cover section 3 to support the wiper drive arm (not shown). The opposite projecting end portion 40 of the shaft 35 has an eccentric cam 41 adjustably fixed thereto as by a screw 42. The cam 41 functions once for each cycle of operation of the shaft 35 (two strokes of the wiper) to close an electrical circuit (later described), the cam being arranged for wiping contact with an actuator 43 of a normally-spring-opened micro-switch 44 mounted on the housing section 2 as shown. The cam is adjusted to close the micro-switch contacts when the wiper has arrived substantially at the desired parking position.

Referring to the operating and dynamic braking circuit controls, Fig. 4, the diagram indicates the driving motor 50 for the unit 1 with the motor armature 51 connected in series with the field winding 52 by a line having portions 53, 54 and 55. Current is supplied to the motor for normal wiper operation by a feed line 56 connected to a contact arm 57 of a double pole, double throw manual switch 60 shown in "off" position. In the indicated "run" position of the manual switch current passes through a motor-speed-regulating variable resistance unit 61 and safety fuse 62 to the line 53 and the motor connections. The dynamic braking circuit of Fig. 4 comprises a line 64 leading from contact arm 58 of the manual switch 60 to one terminal of the micro-switch 44, a line 65 connected to the motor circuit at line 54, and a ground line 66. If the switch 60 is moved quickly from "run" to the indicated "park" position the motor circuit is temporarily interrupted but immediately re-established through a branch line 67 which by-passes the speed control resistance 61 as clearly shown. Then if the wiper is in any other than its parked position the motor drives it at full speed through the remainder of its cycle, i. e. until the cam 41 closes the micro-switch 44. The moment the lines 64 and 65 are connected by the micro-switch the winding of the armature 51 is dead shorted through the ground lines 55 and 66. The motor then acts as a generator and is instantly stalled under the overload of the short circuit. In order that the motor will not be damaged by passage of current through its windings in stopped condition the switch 60 has a spring (not shown) which opposes closing of it in the "park" position. Thus when the operator releases the switch 60 after parking the wiper the switch is automatically moved to "off" position.

In the modified circuit, Fig. 5, the arrangement and operation are generally the same as already described and insofar as they apply the same reference numbers are used. The only difference is that the speed control resistance 61 is maintained in the operating circuit in both operating positions of the manual switch 60, a by-pass line 68 being connected around the switch 60 as clearly indicated. The operation of parking the wiper cannot be accomplished as promptly with the Fig. 5 hookup as with that of Fig. 4 if the resistance unit 61 is set and remains set for low operating speed.

I claim:

1. In and for a reciprocating windshield wiper mechanism connected for operation by a series wound electric motor having field and armature windings, means including a manually operable control switch having a position completing a normal operating circuit for the motor, a dynamic braking energizing circuit connected to the field winding and including a circuit portion short-circuiting the armature winding, a portion of the energizing circuit including a normally open switch closed cyclically by the wiper reciprocating mechanism during normal operation of the motor, said energizing circuit having a portion controlled by the manual control switch in a second position thereof which maintains the operating series circuit of the motor closed.

2. In a wiper device, an electric motor having armature and field windings, mechanism driven thereby and adapted for connection to a wiper to reciprocate it, an operating electric circuit means for the motor connected thereto and including a manually operable switch having two active positions both connecting the motor to a power source for operation of the motor, said circuit including a variable resistance connected to the field winding and rendered effective in one position only of said switch for adjusting the normal operating speed of the motor, a dynamic braking circuit included in said circuit means but not including said resistance, a second position of the switch establishing the dynamic braking circuit and subjecting the field winding directly to the power source while short circuiting the armature winding, and a switch in a different line portion of the dynamic braking circuit and arranged to be closed by said wiper-driving mechanism only when the wiper is in a desired parking position.

COLUMBUS R. SACCHINI.

REFERENCES CITED

The following references are of record in the file of this patent:

UNITED STATES PATENTS

| Number | Name | Date |
|---|---|---|
| 2,307,204 | Ehrlich | Jan. 5, 1943 |
| 2,364,603 | Coxon et al. | Dec. 12, 1944 |